United States Patent [19]
Petershans

[11] Patent Number: 4,978,547
[45] Date of Patent: Dec. 18, 1990

[54] PROCESS FOR PRODUCING LOW-ALCOHOL WINE

[76] Inventor: Horst Petershans, Schillerstrasse 160, D-7050 Bittenfeld, Fed. Rep. of Germany

[21] Appl. No.: 57,601

[22] Filed: Jun. 3, 1987

[51] Int. Cl.[5] ............................ C12G 3/12; B01D 3/10
[52] U.S. Cl. .................................... 426/387; 159/47.1; 159/DIG. 16; 159/DIG. 23; 203/18; 203/21; 203/73; 203/80; 203/DIG. 8; 203/DIG. 13; 426/493; 426/592
[58] Field of Search .................. 426/494, 11, 592, 387, 426/493; 203/18, 6, 21, 73, DIG. 13, 80, DIG. 8; 159/47.1, DIG. 16, DIG. 23

[56] References Cited

U.S. PATENT DOCUMENTS

| | | | |
|---|---|---|---|
| 1,084,833 | 1/1914 | Wagner | 426/494 |
| 1,800,940 | 4/1931 | Heuser | 202/172 |
| 2,880,143 | 3/1959 | Neureuther | 426/494 |
| 4,405,652 | 9/1983 | Boucher | 426/494 |
| 4,468,407 | 8/1984 | Vella | 426/592 |
| 4,477,477 | 10/1984 | Arter | 426/592 |
| 4,490,405 | 12/1984 | Van Horst et al. | 426/494 |
| 4,499,117 | 2/1985 | Bonneau | 426/494 |
| 4,570,534 | 2/1986 | Boucher | 426/494 |
| 4,626,437 | 12/1986 | Schobinger et al. | 426/494 |
| 4,867,997 | 9/1989 | Wiesenberger et al. | 203/DIG. 13 |

OTHER PUBLICATIONS

Coulson et al., "Chemical Engineering," vol. 2, 3rd ed., pp. 598–601.
Weissberger et al., "Distillation," Technique of Organic Chemisty, 1965, vol IV, pp. 2, 3, 9 and 10.

Primary Examiner—Virginia Manoharan

[57] ABSTRACT

A process for producing low alcoholic wine includes the following steps: evaporating alcohol-containing wine in a vacuum evaporator so that a first mixture comprising water, alcohol and flavoring substance is separated from a second mixture having a low-alcoholic content, separating water from said first mixture in a multistage flavor substance apparatus and drawing off a third mixture comprising alcohol and flavoring substance, distilling alcohol from the third mixture, adding the water from the multistage flavor substance apparatus to a mixing vessel in an amount, which together with the low-alcohol second mixture and the flavoring substances produces a quantity of low-alcoholic wine having an alcoholic content below legally determined values for low-alcoholic wine, the process allowing only outputs of low-alcoholic wine, distilled alcohol and flavoring substances and inputs of essentially only the alcohol-containing wine.

16 Claims, 3 Drawing Sheets

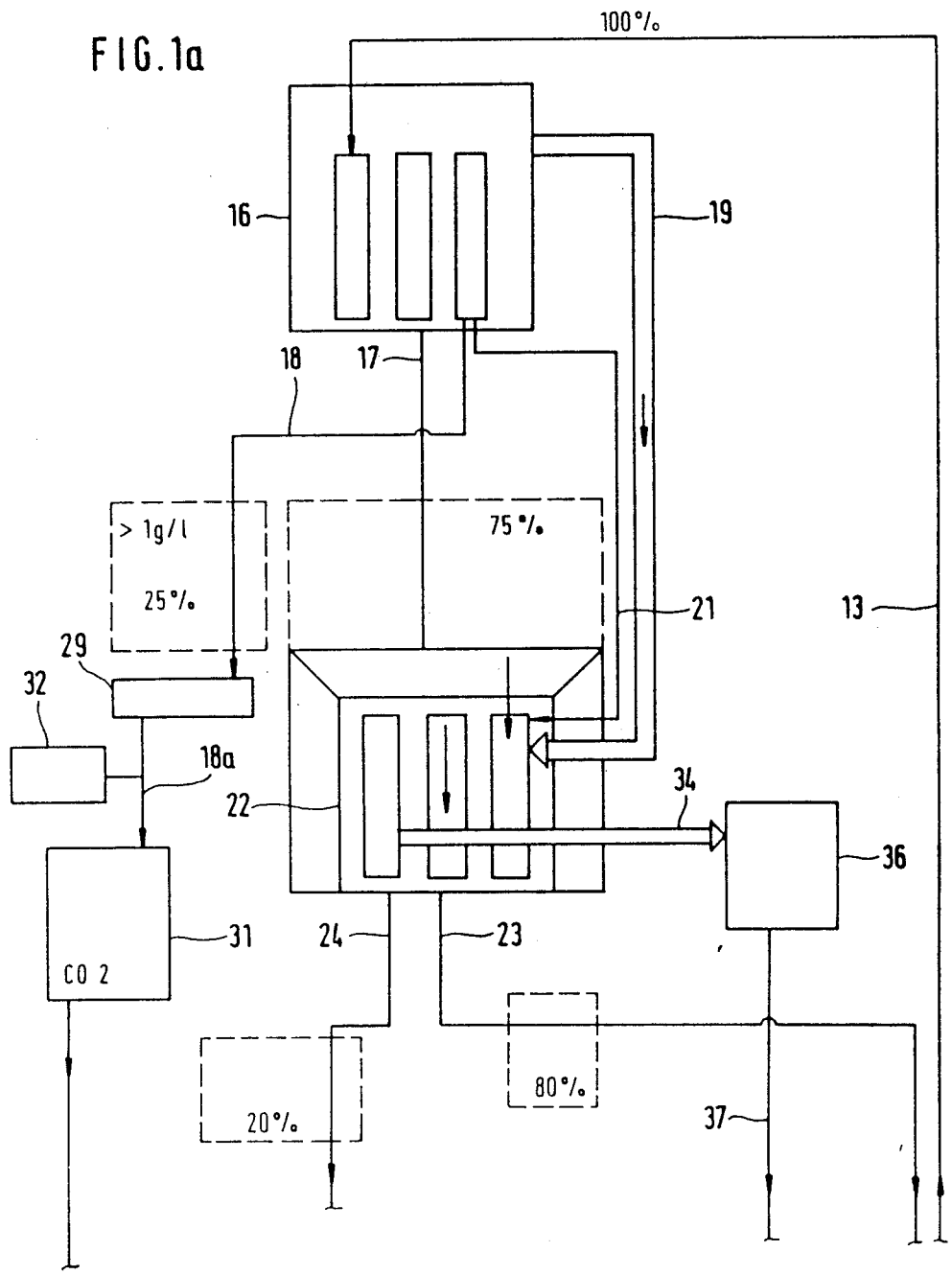

PROCESS FOR PRODUCING LOW-ALCOHOL WINE

This invention relates to an apparatus and process for producing low-alcohol wine.

What is described as "wine" is not standard throughout the world. Depending on the laws, wine is fermented grapemust. However, alcoholic drinks derived from fruits are also described as "fruit wine", and "wine" derived for example from apples and/or pears is described as "apple wine" or also simply as must. In the context of the present remarks, beer is not described as "wine" in any of its embodiments. On the other hand, sherries, palm wines or the like are also described as "wine". The invention is not suitable for liqueurs. On the other hand, it is certainly suitable for more or less artificial wines, for example, finesse wines, or even completely artificially produced wines. It is also suitable for treating those "wines" to which undesirable alcoholic constituents such as, for example, methyl alcohol, have been added deliberately or inadvertently.

BACKGROUND OF THE INVENTION

Hereinafter the term low-alcohol wines will be used because there are no wines which are actually alcohol-free in which the alcohol content is 0%. Alcohol occurs everywhere where, for example, sugar has undergone fermentation. Accordingly, foodstuffs generally regarded as alcohol-free such as, for example, bread, fruit juices or even fruits, in particular very sweet fruits and in particular, if they have been stored for some time, nevertheless contain alcohol residues.

When a wine can be described as "low-alcohol" it means in total an alcohol content that is below the permissible value for low-alcohol wines. It follows in some cases from the national laws and in some cases from the accepted view. For example, according to the German Wine Act, a wine is low in alcohol (sometimes also described incorrectly as "alcohol-free") if the alcohol content is below 0.5 gram/liter of wine.

As far as we know, in countries of the Moslem faith, wines are low in alcohol if the proportion is below 2 g/l. These regulations have to be borne in mind if the invention is put into practice. However, once the method disclosed by the invention has been adopted, it is only a question of the choice of the operating parameters and/or the construction of the system in order to arrive finally at a low-alcohol wine.

The attempt to reduce the alcohol content in such drinks is already ancient. In this connection, reference is made to the German Patent No. 377,406 which goes back to an invention in the year 1918.

Attempts in this direction have never been discontinued. A new attempt at a solution is disclosed in the European Patent Application No. 0,058,634.

Unfortunately it has as yet not proved possible to produce a low-alcohol wine which not only satisfies the forced adoption of a healthy lifestyle but, on the contrary, has the accustomed taste which is associated with wine. It is only the color which makes it possible to distinguish a low-alcohol wine produced today in any way at all as a red wine, a white wine or a rosé wine. There can be no question of such a wine having a real taste, let alone of the numerous different nuances of the individual vine types and, in this connection, also the different locations being shown to advantage.

The efforts to produce a low-alcohol wine are extremely intense. As yet the means of industry and commerce have not been sufficient to disclose practical methods of mass producing really good low-alcohol wines at an acceptable price. It is hoped to find a method through fairly large financial inputs, and for this reason materials subject to high tax are very frequently employed in the research.

The problem of the low-alcohol wines is very pressing and its solution would result in considerable commercial advantages:

(a) more of the wine which is often produced with materials subject to tax could be sold profitably and then, on the other hand, fortified with materials subject to tax.

(b) Even those wine connoisseurs who have difficulties with internal organs such as, for example, the liver and the kidneys, could then continue to drink wine.

(c) It would also be possible to reduce the risk of cancer which, after all, according to recent discoveries is partly due to the fact that alcohol is a solvent for some of the constituents originating from tobacco smoke and therefore distributes these carcinogenic substances "better" in the body.

(d) The range of drinks in service areas on motorways could be increased. An experiment was once carried out on the Swiss motorways which showed that the public would actually buy low-alcohol wine at service areas. However, the qualities available did not satisfy the minimum requirements.

(e) Wine could be exported also to those countries in which, because of its alcohol content, wine must not be drunk for religious reasons.

(f) Those accidents which arise from excessive consumption of wine could be avoided.

Disadvantages of the solution specified in the European Patent Application No. 0,058,634 are as follows:

(a) it is assumed that, on the one hand, fruit juices are present which are used for flavor blending and which are first of all deflavored. This means that the process is only used for those types of wines in which the flavor is blended by means of fruit juices. There are, however, many wines to which fruit juices are not added.

(b) Two plants are required which are not integrated into each other, viz. a plant which renders the as yet unblended wine low in alcohol and a plant which deflavors a fruit juice.

(c) According to page 3, line 12, temperatures have apparently also to be permitted in the evaporator which approach 100° C. The known process has to accept evaporation temperatures which are much too high. These are harmful even if the residence times only amount to a few minutes.

(d) The process is also much too expensive in terms of energy costs since, according to page 3, paragraph 2, evaporation vapors which contain alcohol and flavoring substance have to be cooled to temperatures below 20° C. Energy naturally has to be supplied again in order, subsequently, to separate the alcohol from the flavoring substance and it is then also not of any use when, as it is stated in paragraph 1 on page 4, no appreciable detrimental heat effects occur during prolonged rectification in the distillation column.

(e) If the quantities of deflavored fruit juice concentrate+distilled water specified, for example, on pages 7 and 8 on the one hand and of dealcoholized wine concentrate are considered, this process obviously adopts the policy of forcing down the alcohol content by quantitatively large proportions of those liquids which are inherently alcohol free, namely distilled water and deflavored fruit juices. If, therefore, according to page 1, line 10, the alcohol content is 5 g/kg or according to page 8, line 11, is 2.9 g/L, this simply means that the dealcoholized wine concentrate must still contain quite a lot of alcohol which is then simply diluted by diluting with completely alcohol-free liquids such as distilled water, deflavored fruit juice and naturally also flavoring substances which are alcohol-free. For if the flavoring substances are extracted from the fruit juices, they are naturally likewise alcohol-free. These conjectures are probably correct because, after all, the vapor condensate contains 26.8% alcohol, for example, according to page 9, line 16.

OBJECT AND STATEMENT OF THE INVENTION

The object of the invention is to provide an apparatus and a process for producing low-alcohol (alcohol-free) wine which is capable of mass production, and to produce a wine which the sense organs participating in tasting cannot distinguish from wine containing alcohol.

It should be possible to produce those qualities which the wine also had before its treatment according to the invention. The invention must be suitable for red wines, white wines and rose wines to an equal extent.

As regards the apparatus, this object is achieved by an apparatus according to the invention, having the following features:
  a wine stock vessel,
  a vacuum evaporator having series connected upstream and downstream stages and an outlet,
  a wine feed pipe connecting the wine stock vessel to the vacuum evaporator,
  an vessel,
  a drainage pipe connecting the outlet of the vacuum evaporator to the vessel,
  an oxidation prevention apparatus connected between the outlet and the vessel.
  a mixing vessel connected to the vessel,
  a multistage flavoring substance apparatus having upstream and downstream stages,
  a water/alcohol/flavoring substance pipe connecting the multistage flavoring substance apparatus to the vacuum evaporator upstream of the outlet,
  a distillation column having a large number of trays,
  an alcohol flavoring substance pipe connected between an upstream stage of the multistage flavoring substance apparatus and the distillation column,
  flavoring substance pipes leading from the trays in the distillation column to the mixing vessel, and
  a water outlet pipe emerging from a downstream stage of the multistage flavoring substance apparatus.

Any wine can therefore be processed as it is delivered and regardless of its previous history. It is not necessary from the point of view of the equipment or the process to start right from the point at which no fruit juice has as yet been added. This renders a preliminary decision on which wine has now to be treated according to the invention and which is to be sold with the natural alcohol content superfluous.

Advantageously, the invention includes the following additional features:

The water outlet pipe is connected to the mixing vessel. This feature achieves the result that it is not necessary to produce separately distilled water or demineralized water. This is of advantage in terms of cost and energy. In addition, it is the case that such "water" is never quite pure. On the contrary, it still contains flavoring susbstances and it is not a matter of indifferennce whether the "water" from the water outlet pipe or demineralized water, distilled water or the like is used. It is precisely through this teaching that a sensory unadulterated quality compared with the original wine is obtained which can no longer be outdone.

A heat exchanger outlet pipe has a first leg that is situated in the water outlet pipe and a second leg that is part of the wine feed pipe. These features provide quite considerable advantages in terms of energy since the wine is now initially heated in the wine feed pipe and the "water" reaches the mixing vessel in a cold state.

The second mixture volume is 25% plus/minus 50% of the wine feed volume; the second mixture volume is 25% plus/minus 40% of the wine feed volume; the second mixture volume is 25% plus/minus 30% of the wine feed volume; the volume is 25% plus/minus 20% of the wine feed volume; or the second mixture drainage pipe emerges from a stage of the vacuum evaporator in which the alcohol content of the second mixture volume is negligible. These features make it possible for the second mixture to be rendered alcohol-free to the extent that this is necessary in relation to the total alcohol content subsequently permissible.

The alcohol content of the second mixture volume is 3 g/L. According to this teaching, those alcohol values are then achieved in the mixing vessel which result in many countries in "alcohol-free" wine.

The alcohol content of the second mixture volume is 1.5 g/L. This value is correct for German legislation values.

The second mixture volume has an alcoholic content such that when the second mixture volume is mixed with the water and the flavoring substances in the mixing vessel a wine is produced that is at an alcohol content level below the level described as "low in alcohol" in a country of concern. This specifies the alcohol content of the second mixture volume depending on the particular legal requirements in the country of concern.

The vacuum evaporator is a high-vacuum evaporator with an operating temperature in the range of 20 degrees Centigrade to 60 degrees Centigrade. As a result of this feature, the wine suffers no detrimental effect either due to excessive heat or to excessive duration of the evaporation in vacuo.

The operating temperatures are 40, 45 and 50 degrees Centigrade. Very good results were achieved with these values.

The oxidation prevention apparatus comprises a cooling apparatus. This specified how oxidation can be prevented without chemical additives.

The oxidation prevention apparatus comprises an apparatus for dispensing an antioxidant. This feature reveals how oxidation can be prevented by chemical agents which, for example, in the case of vitamin C, are completely harmless. However, $H_2SO_3$ or $SO_2$ can also be added. It is also possible to combine the cooling apparatus with this feature.

An inert gas pressurizer apparatus is connected to the vessel. Moreover, this feature prevents the oxidation of the second mixture still further. With the apportionment, for example, in accordance with the proportions of second mixture volumes to the wine feed volume stated above, and in particular, in the case in which the alcohol content of the second mixture volume is negligible, this second mixture consists of tartaric acid, malic acid, lactic acid, the colorants, mineral substances, sugar, tannins, and glycerine. Said second mixture has a consistency similar to gear lubricating oil. In the case of white wine, the second mixture has a slight brownish appearance and in the case of a red wine a dark-red to black appearance. The viscosity of the second mixture is essentially dependent on the residual sugar content.

A plurality of flavoring substance intermediate containers are situated in the path of the flavoring substance pipes. This feature prevents the flavoring substances flowing immediately into the mixing vessel and, if it is necessary for the purpose of selecting the flavor, it is then possible to allow more of one flavoring substance and less of another flavoring substance to flow in. Preferably, the alcohol content of the flavoring substances is fixed so that the limiting value of, for example, 5 g/L is not exceeded because of excessively high alcohol contents.

Means are provided for cooling the flavoring substance intermediate containers. This feature achieves the result that the flavoring substances do not change after leaving the distillation column.

The process, according to the invention, for producing low alcoholic wine comprises:
  fractionating alcohol-containing wine in a vacuum evaporator so that a water/alcohol/flavoring substance mixture is separated from second mixture having a low-alcoholic content, which, when mixed with water and flavoring substances later in the process produces low-alcoholic wine having an alcoholic content below permissible values for low-alcoholic wines,
  drawing off the water/alcohol/flavoring substance mixture from the vacuum evaporator in a quantity substantially greater than 50% of the volume of the alcoholic containing wine, and drawing off the low-alcohol second mixture from the vacuum evaporator rapidly and stabilizing the second mixture rapidly to prevent oxidation thereof,
  separating water from the water/alcohol/flavoring substance mixture in a multistage flavoring substance apparatus,
  distilling alcohol from the resulting alcohol/flavoring substance mixture,
  feeding the resulting flavoring substances, at least in part, into a mixing vessel,
  feeding the low-alcohol second mixture into the mixing vessel, and
  adding water to the mixing vessel in an amount, which together with the low-alcohol second mixture and the flavoring substances produces a quantity of low-alcoholic wine.

Advantageously, the process includes the following additional features:

The water that is added to the mixing vessel is obtained from the multistage flavoring substance apparatus, at least to a proportion substantially determining the sensory analysis of the low-alcoholic wine.

The water is separated from the water/alcohol/flavoring substance mixture in the multistate flavoring substance apparatus in the order of magnitude of 80% water and 20 alcohol/flavoring substance mixture, by quantity.

BRIEF DESCRIPTION OF THE DRAWINGS

The invention is now described on the basis of a preferred exemplary embodiment. In the drawing:

FIGS. 1a and 1b show connection diagrams of the plant,

DETAILED DESCRIPTION

Figure 1B:
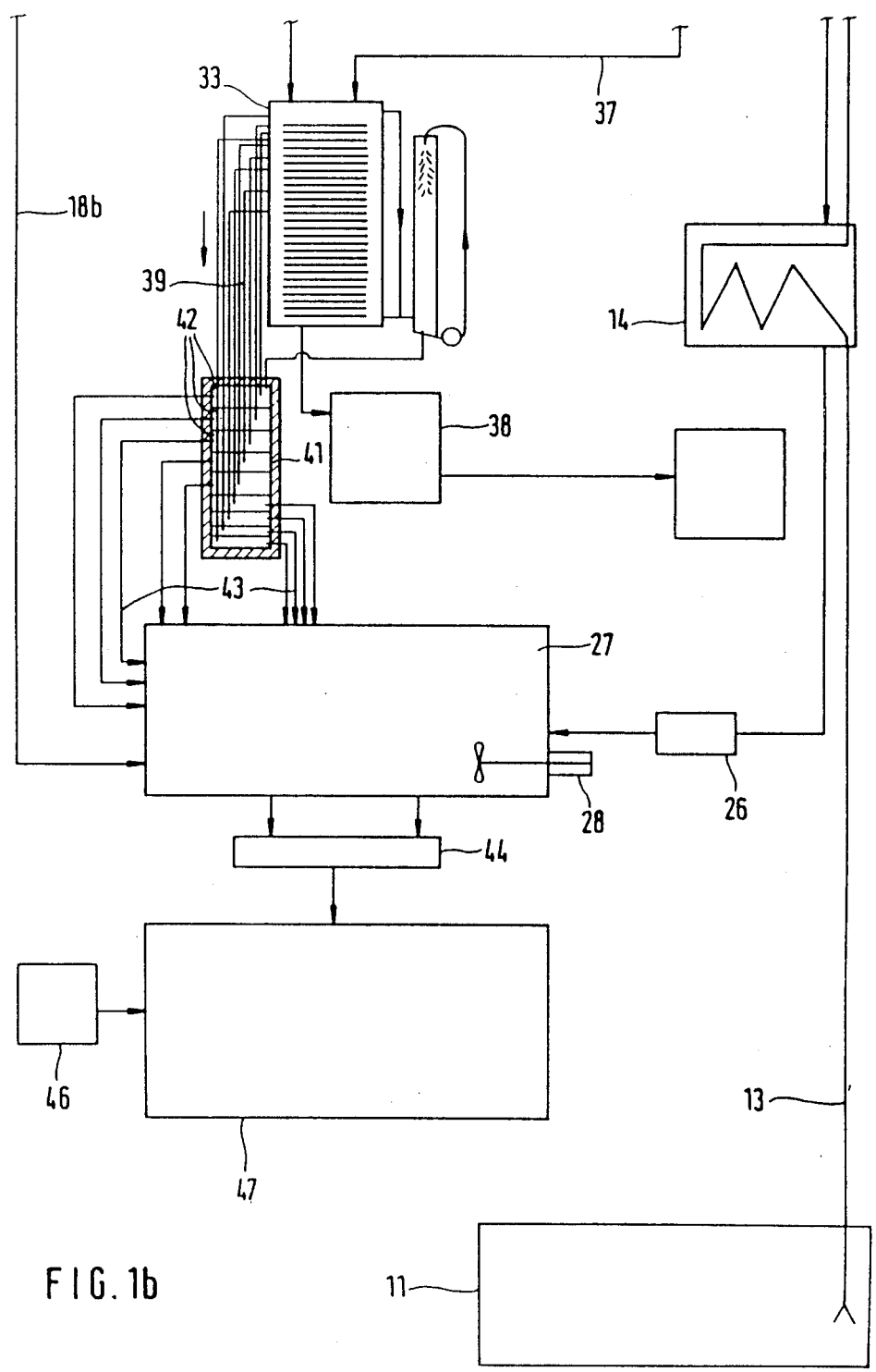

The constructional units shown diagrammatically in FIGS. 1a and 1b may (when the invention is known) be built, for example, by those companies which produce distilling equipment, flavoring substance separation plants, milk processing equipment, evaporation plants or the like. Such companies are, for example, Wiegand, Karlsruhe GmbH, 7505 Ettlingen, Hans Schuy, Molkereimaschinen, 6418 Hünfeld 1 and Schmidt, Bretten, as well as Alfa-Lavall, Sweden which has a branch in Germany and the Swiss company of Unipektine.

In FIGS. 1a and 1b a wine stock tank 11 is provided which receives the wine to be dealcoholized. A pump 12 which can be seen in FIG. 2 pumps into a wine supply pipe 13. The latter passes through a heat exchanger 14. Since a hot medium flows through said heat exchanger 14 in counter current in a manner yet to be explained, the wine downstream of the heat exchanger 14 is at 40° C. From the hot leg of the wine supply pipe 13, the wine, which forms 100% of the volume as seen from the consideration below, flows into a vacuum evaporator 16, which is explained more precisely in FIG. 2. Viewed diagrammatically, the vacuum evaporator 16 has three stages. From the third stage, a water-/alcohol/flavoring substance pipe 17 emerges which carries 75% of the total volume as a water/alcohol/flavoring substance (WAF) mixture (first mixture). The WAF pipe 17 is a manifold which emerges from all stages. Here the first stage contributes the most in terms of quantity, the second stage less and the third stage the least. Furthermore, an additional drainage pipe 18 emerges from the vacuum evaporator and, in particular, from the last stage of the latter. This additional drainage pipe 18 contains 25% of the volume a second mixture. Its composition was explained in the discussion of the subclaims. The second mixture contains 1-2 g/liter alcohol.

The third pipe to emerge from the vacuum evaporatior 16 is a vapor pipe 19 which drains the vapors from the last stage. The vapors are negligible in relation to the liquid volume. However, since they are hot, they are not negligible in terms of energy. In addition, these vapors may also have a small amount of flavoring substance entrained in them.

The vacuum evaporator has, of course, a vacuum pump which is not shown in FIG. 1a. In the last stage this produces a vacuum which is communicated in diminishing form also to the stages upstream.

The vacuum pump draws a volumn flow, which is negligible in terms of quantity and which is also negligible in terms of energy but contains $SO_2$ and $CO_2$ and also, in particular, a residue of flavoring substances, from the last stage of the vacuum evaporator 16. This volume extracted by the vacuum pump is fed via a vacuum pump pipe 21 to the first stage of a flavoring substance plant 22 which contains three stages. This flavoring substance stage 22 is not described separately since it can have a configuration such as is normal in the fruit juice industry and can be ordered, for example, from one of the abovementioned companies. As is evident from FIG. 1a, the vapors from the vapor pipe 19 are fed into the first stage of the flavoring substance plant 22 situated on the right and therefore also contribute to a positive energy balance. The hot water/alcohol/flavoring substance mixture from the WAF pipe 17 is fed without intermediate storage into the first stage of the flavoring substance plant 22.

The flavoring substance plant 22 consists of a tubular evaporator with built-in let-down vessel, is operated at temperatures between 80° and 105° C. and is capable of separating water from the alcohol/flavoring substance mixture. At the same time, the construction of the flavoring substance plant 22 is such that if the water/alcohol/flavoring substance mixture from the WAF pipe 17 is assumed to be 100% (the volumes from the vacuum pump pipe 21 and the vapor pipe 19 are negligible in comparison), then the flavoring substance plant 22 delivers 80% of the volume via a water outlet pipe 23 and 20% of said volume (third mixture) via an alcohol/flavoring substance pipe 24. The water from the water outlet pipe 23 is fed without intermediate storage to the heat exchanger 14. Since the water is between 80° and 105° C., it is understandable that the wine downstream of the heat exchanger 14 has heated up in the specified manner. The heat exchanger 14 is not in itself sufficient to cool the water in the water outlet pipe 23. On the contrary the water outlet pipe 23 is also provided with a cooler 26 which cools the water down to 15° before it flows into the mixing vessel 27 which has a volume of about 25,000–50,000 L. A stirring mechanism 28 operates in said mixing vessel 27. The water from the wine flowing in the water outlet pipe 23 is not distilled or demineralized water. On the contrary, it still contains important traces of the wine such as acid, extract substances, and flavoring substances. It therefore has a substantially different conductivity and a substantially different pH value from, for example, distilled water. The important point is that the heat is very rapidly extracted from said "water" into the specified region and the "water" does not stop before it is in the mixing vessel 27.

The second mixture drawn off through the drainage pipe 18 must also not stop without cooling. Insofar as the boxes in the drawing specify percentages, these boxes are not to be regarded as containers. In the drainage pipe 18 the vacuum evaporator 16 is therefore immediately followed by a cooler 29 which rapidly cools the second mixture to 15° C. From the cooler 29 the cooled is fed via an drainage line 18a to a vessel 31. Into said drainage pipe 18a, an antioxidant is also dispensed via a dispensing device 32. This may be, for example, $SO_2$ and/or $H_2SO_3$ and/or vitamin C or the like.

The vessel 31 is pressurized. The pressurizing gas is $CO_2$, which is likewise known not to permit oxidation reactions.

From these efforts to stabilize the second mixture which have been mentioned it follows that it is necessary to cause the second mixture to flow out of the vacuum evaporator 16 without delay and not to give it any opportunity of changing chemically in any way. The second mixture then flows from the vessel 31 via the drainage pipe 18b into the mixing vessel 27. However, the second mixture must not under any circumstances happen to reach the mixing vessel 27 first. On the contrary, it has to be added to the volume of the "water" which is much larger in terms of quantity, since otherwise there would again be a risk that the second mixture would change.

As mentioned above, 20% by volume of alcohol+flavoring substance emerges from the alcohol/flavoring substance pipe. This pipe leads to a distillation column 33. This operates with counter current distillation. It contains over forty separation stages, or better, between sixty and eighty. From the last stage of the flavoring substance plant 22 a second vapor pipe 34 emerges which may be neglected in terms of quantity and whose vapors are condensed in a vapor condenser 36.

This condensate reaches the distillation column 33 via a condensate pipe 37.

With batchwise operation of the counter current distillation plant, the vapor condensate containing alcohol and flavoring substances fed in in the lower third up to half the height is separated into the following fractions according to boiling range and removed via the column head:

First runnings, predominantly methanol and ethyl acetate: up to 76 degrees C.,
Alcohol fraction, predominantly ethanol: 76 to 78 degrees C.,
Aromatic substance fractions, the most important aromatic substances, little ethanol: 77 to 97 degrees C.

With continuous operation of the counter current distillation plant, the vapor condensate containing alcohol and aromatic substances fed in in the central third of the fractionating column is fractionated as follows: the first runnings and the alcohol fraction in the boiling range up to about 77° C. are removed via the column head 38, the flavoring substance fractions in the boiling range from 77° to 79° C. are removed laterally below the feed point of the distillation column 37, and in particular via a multiplicity of flavoring substance pipes 39. The flavoring substance fractions which are produced in the range from 77°–102° C. and which are drawn off via the flavoring substance pipes 39 contain both the flavoring substances typical of the type and also the fermentation flavoring substances. The flavoring substance pipes 39 run into a thermally insulated plant 41. These contain exactly the same multiplicity of flavoring substance containers 42, which are cooled, corresponding to the multiplicity of the flavoring substance pipes 39. From the flavoring substance containers 42 there emerge flavoring substance drainage pipes 43 which lead to the mixing vessel 27. The flavoring substance drainage pipes 43 are opened as required by the sensory analysis in the mixing vessel 27. If the apparatus is operated continuously with a single type of wine, the quantity flowing in through the flavoring substance drainage pipe 43 can be permanently adjusted once and then remain the same.

If the type of wine varies, it is better to taste the wine in the mixing vessel 27 and supply the flavoring substances accordingly. The wine in the mixing vessel 27 is compared sensorily with the input samples. While the flavoring substances are being added, the alcohol content is monitored since different flavoring substances contain different amounts of alcohol.

Downstream of the mixing vessel 27, the final mixture is then treated by generally known processing techniques to produce the ready-to-drink low-alcohol drink by impregnating the mixture with the required quantity of carbonic acid gas, by sterile filtration such as the filter 44 shown and/or by pasteurization to prevent microbial deterioration and by adding antioxidants such as, for example, $SO_2$ or vitamin C to prevent oxidative deterioration. A dispensing apparatus 46 supplies $CO_2$. In the area 47, the wine is bottled.

Per se it is in fact the case that the alcohol in the wine not only acts as a preservative but also contributes to the fact that the bloom, the bouquet and the taste impression can be more rapidly experienced on the palate.

The readily volatile flavoring substances are, of course, also released in the plant according to the invention but cannot, however, escape since the plant is sealed.

Probably the flavoring substances are split up by the fractionation so that they later appear substantially more powerful but are not so readily volatile because of the more than weak alcoholic solution of the entire liquid as would be the case for a solution with a higher alcohol content.

Furthermore, it is probably the case that the $CO_2$ acts as a carrier for the readily volatile flavoring substances and the desired effect of the sensory perception of the bloom, the bouquet etc. is again obtained on the whole. The $CO_2$ loosens up the drink somewhat so that the impression of a fresh wine is finally obtained.

Figure 2:
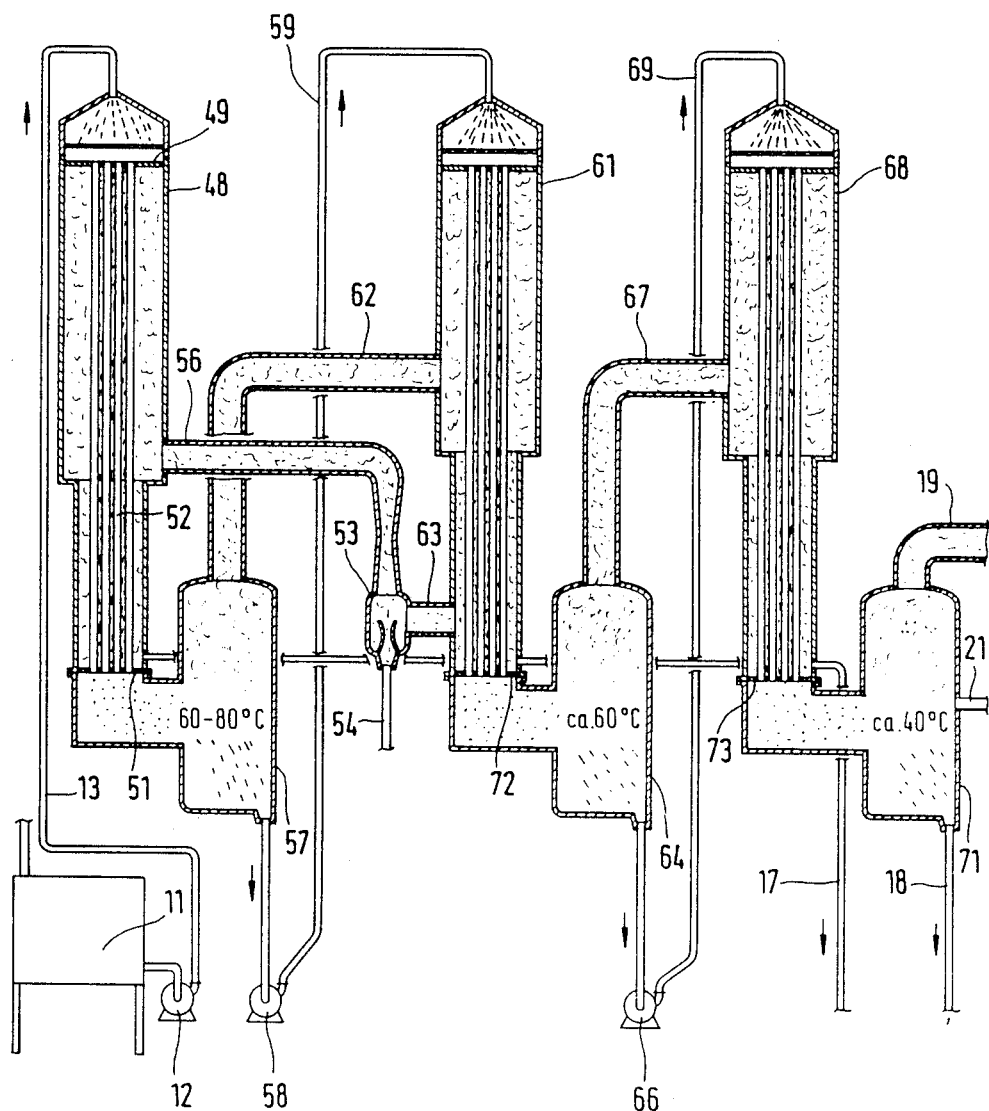
FIG. 2 shows a connection diagram, partly in principle, of the vacuum evaporator.

FIG. 2 shows the wine stock tank 11 and the pump 12 at the bottom on the left hand side. The latter pumps the wine via the heat exchanger, which has been omitted, through the wine feed pipe 13 to the first stage 48. This has, in a known manner, a sieve tray 49 at the top and a sieve tray 51 at the bottom. Between these there extend, in a known manner, the tubes 52. Into the input port 54 of an injector 53 hot steam is injected at 130° C. which heats up the tubes 52 because it is fed to the first stage 48 via a pipe 56. The outlet of the tubes 52 is followed by a separator 57. In the latter atmospheric pressure prevails. In the stage 48, the wine is heated to about 70° C. At the lowest point in the separator 57, the liquid is drawn off by a pump 58 and fed via a pipe 59 to the second stage 61. Via a pipe 62, the vapors are fed from the separator 57 into the jacket of the second stage 61 from which they are partially extracted again via the pipe 63 and enter the circuit again through the injector 53. The quantities fed into the injector 53 may be neglected in terms of volume.

The second stage 61 again has a separator 64. In this the liquid, on the one hand, is again separated and is drawn off at the lowest point in the separator 64 by a pump 66 and the vapors on the other hand are separated which collect in the dome of the separator 64 and are fed via a pipe 67 to the third stage 68. In the separator 64 the temperature is about 60° C. and there is a partial pressure of 30 to 40 cm water column.

The pump 66 again pumps the liquid via a pipe 69 to the top end of the third stage 68, as a result of which the liquid trickles downwards through the tubes and the jacket is heated by the vapors. The third stage 68 again has a separator 71 in which the temperature is about 40° C. and in which the partial pressure is about 60 to 70 cm of water column. At the lowest point in the separator 71 the drainage pipe 18 emerges. At this point, therefore, the 25% second mixture with its gear lubricating oil consistency is produced.

The vapor pipe 19 emerges from the dome of the separator 71.

Finally, the water/alchohol/flavoring substance pipe 17 emerges in each case from a point situated in a region far down in each stage, and in particular, in the stage 48 just above the bottom sieve tray 51, in the second stage just above the second sieve tray 72 and in the third stage 68 just above the second sieve tray 73.

The highest vacuum prevails therefore in the separator 71 since the vacuum pump pipe 21 is connected at that point to a vacuum pump which is not shown.

As those skilled in the art will recognize, such apparatuses as shown in FIG. 2 exist in an almost identical form producing condensed milk.

The vessel 31 may also be short-circuited by a bypass pipe. This is advisable if the apparatus has been run in. The vessel 31 is, after all, a buffer tank which prevents the second mixture flowing into the mixing vessel 27 without it being possible for it to be diluted with the liquid present in the mixing vessel 27. Furthermore, if it is desired to add $CO_2$ to the second mixture, this can also be introduced into the pipe.

Furthermore, a preferred modification of the invention compared with this exemplary embodiment is not to introduce the drainage pipe 18b directly into the mixing vessel. On the contrary, in this case there is provided downstream of the cooler 26 a ribbon mixer which operates without a mechanical drive and entrains no air. In this the mixing takes place only by means of the kinetics of the liquids flowing in. Such a ribbon mixer is described, for example, in the journal entitled "Das Erfrischungsgetränk-Mineralwasserzeitung", Apr. 14, 1976, issue No. 15, volume 29 as a "statically operating tubular mixer and its application". The mixture emerging from the water outlet pipe 23 and the drainage pipe 18b is then fed into the mixing vessel 27.

In order to achieve further heat energy saving, provision is made in a further preferred embodiment for the water outlet pipe 23 containing hot water at about 97° C. to be fed first to a heat exchanger which is situated in the WAF line 17 and only from that point to the heat exchanger 14.

In a further preferred embodiment, the flavoring substance drainage pipes 43 pass through a continuous cooler.

The purpose of the cooler 29 is to prevent the caramelization of the sugar in the second mixture. The hot sugar would otherwise be converted into HMF (hydroxymethylfurfurol).

I claim:

1. Process for producing low alcohol wine, said process consisting of feeding to a vacuum evaporator essentially only alcohol-containing wine, evaporating said alcohol-containing wine in said vacuum evaporator so that a first mixture comprising water, alcohol and flavoring substance is separated from a second mixture having a low-alcoholic content;

drawing off said first mixture from said vacuum evaporator in a quantity substantially greater than 50% of the volume of said alcohol-containing wine; drawing off said low-alcohol second mixture from said vacuum evaporator and stabilizing said second mixture to prevent oxidation thereof;

feeding said low-alcohol second mixture into a mixing vessel;

separating water from said first mixture in a multistage flavor substance apparatus and drawing off a third mixture comprising alcohol and flavoring substance;

distilling alcohol from said third mixture;

feeding the resulting flavor substances, at least in part, into said mixing vessel; and adding said water from said multistage flavor substance apparatus to said mixing vessel in an amount, which together with said low-alcohol second mixture and said flavor substances produces a quantity of low-alcoholic wine having an alcoholic content of less than 5 g./l.

2. Process as claimed in claim 1, in which said water is separated from said first mixture in said multistage flavor substance apparatus in the order of magnitude of 80% water and 20% said third mixture, by quantity.

3. Process as claimed in claim 1, in which said alcohol-containing wine is heated in a heat exchanger by heat energy in said water separated from said multistage flavor substance apparatus.

4. Process as claimed in claim 1, in which said first mixture is drawn off from said vacuum evaporator in quantity of about 75% of the volume of said alcohol-containing wine.

5. Process as claimed in claim 1, in which said second mixture is drawn off from said vacuum evaporator in quantity of about 25% plus and minus 50% of the volume of said alcohol-containing wine.

6. Process as claimed in claim 1, in which said second mixture is drawn off from said vacuum evaporator in quantity of about 25% plus and minus 40% of the volume of said alcohol-containing wine.

7. Process as claimed in claim 1, in which said second mixture is drawn off from said vacuum evaporator in quantity of about 25% plus and minus 30% of the volume of said alcohol-containing wine.

8. Process as claimed in claim 1, in which said second mixture is drawn off from said vacuum evaporator in quantity of about 25% plus and minus 20% of the volume of said alcohol-containing wine.

9. Process as claimed in claim 1, in which said alcohol content of produced low-alcoholic wine is 3 g/L.

10. Process as claimed in claim 1, in which said alcohol content of produced low-alcoholic wine is 1.5 g/L.

11. Process as claimed in claim 1, in which said vacuum evaporator operating temperature is in the range of 20 degrees C. to 60 degrees C.

12. Process as claimed in claim 1, in which said high vacuum evaporator is a multistage evaporator, in which the operating temperatures are in the range of 40 to 50 degrees C.

13. Process as claimed in claim 1, in which said second mixture is prevented from oxidation by cooling.

14. Process as claimed in claim 1, in which said second mixture is prevented from oxidation by dispensing an antioxidant.

15. Process as claimed in claim 1, further consisting of feeding resulting flavoring substances from said distilling step as a plurality of different flavoring substances into a plurality of flavoring substances intermediate containers, and then feeding said different flavoring substances from said containers at least in part into said mixing vessel.

16. Process as claimed in claim 15, further consisting of cooling said flavoring substance intermediate containers.

* * * * *